Feb. 23, 1971   J. L. LAUER   3,565,777
METHOD FOR REMOVING SULFUR DIOXIDE FROM STACK GASES
Filed Oct. 4, 1968                2 Sheets-Sheet 1

INVENTOR.
JAMES L. LAUER
BY Donald R. Johnson
ATTORNEY

Feb. 23, 1971 J. L. LAUER 3,565,777
METHOD FOR REMOVING SULFUR DIOXIDE FROM STACK GASES
Filed Oct. 4, 1968 2 Sheets-Sheet 2

*INVENTOR.*
JAMES L. LAUER
BY Donald R. Johnson
ATTORNEY

United States Patent Office 3,565,777
Patented Feb. 23, 1971

3,565,777
METHOD FOR REMOVING SULFUR DIOXIDE FROM STACK GASES
James L. Lauer, Penn Wynne, Pa., assignor to Sun Oil Company, Philadelphia, Pa., a corporation of New Jersey
Filed Oct. 4, 1968, Ser. No. 765,151
Int. Cl. B01j 1/10
U.S. Cl. 204—157.1
2 Claims

ABSTRACT OF THE DISCLOSURE

A method and apparatus for removing sulfur dioxide from stack gases wherein the stack gas is first subjected to electrically charged water droplets and subsequently to ultraviolet light.

This invention relates to an improved process and apparatus for cleaning gas, and more particularly relates to the removal of sulfur dioxide from stack gases.

The contamination or pollution of our air by sulfur dioxide is a well-recognized problem today. The contaminant, sulfur dioxide, is generally formed during the combustion of high sulfur-containing fuels such as coal or residual fuel oils. Part of the problem can be overcome by the employment of low sulfur-containing fuels, particularly in the formation of residual fuels; however, since no economical way has been found to desulfurize coal, the solution of this problem has had to be overcome by a different method. Specifically, these sulfur compounds have to be removed from the flue gases. Additionally, some of the sulfur dioxide contained in residual fuels can also be removed by stack-gas removal processes.

Accordingly, over the years many patents have issued and processes have developed for the removal of $SO_2$ from stack gases. Examples of such patents and processes are U.S. Pats. Nos. 2,992,884 and 3,079,223 which employ solid adsorbents; 2,994,585, 3,260,035, and 3,047,364 which employ liquid adsorbents; and 3,087,790 and 2,772,315 which reduce the sulfur dioxide to sulfur. Although many of these methods have been tried experimentally, none appears to be self-supporting in today's market primarily due to the high capital cost involved.

It has now been discovered that substantial quantities of sulfur dioxide can be removed from stack gases by first subjecting the gas to electrostatically charged droplets of water and subsequently passing the gas through a region illuminated by actinic light. The contaminated gas is subjected to electrostatically charged water droplets because it has been found that considerably more $SO_2$ can be absorbed by a water spray containing charged droplets than can be dissolved in uncharged water. This is based on Onsager's principle, according to which the dissociation constant of a weak acid is increased in proportion to the electric field strength applied and decreased in inverse proportionality to the dielectric constant. A small charged water droplet is subjected to tremendous electric fields, and hence a greater amount of $SO_2$ will absorb thereon.

The electrostatic droplets are produced by having within the employed passage means, but substantially outside the path of the gas, a liquid spray chamber having therein liquid spray heads. Water is supplied to the spray heads, and water droplets are emitted therefrom and subjected to electrostatic ionizing means. The ionizing means which are located between the spray heads and the gas flow path consist of alternately spaced discharging and nondischarging electrodes. The spacial paths between electrodes are rendered electrically nonconductive by means of electrical insulation applied at the exterior surface of the nondischarging electrodes. When the electrical insulating material is applied to the exterior surface of the nondischarging electrodes of the ionizing means, it aids in the prevention of voltage breakdown in the spacial path between the discharging and nondischarging electrodes. Although the power supply is not critical, generally direct current in the voltage range of 10,000 to 20,000 volts is preferred. The electrical charging means can be of any form well known in the art, such as disclosed in U.S. Pats. 2,864,-458, 2,949,168 and 3,331,192.

The second principle involved herein is that when $SO_2$ and $H_2O$ are subjected to intense actinic light, such as ultraviolet light, a photochemical reaction will take place. The water will be ionized and the hydrogen ions will react with the sulfur dioxide to liberate free sulfur in crystalline form. The sulfur can then be separated from the gas by methods well known in the art. Although the gas can be subject to continuous exposure to ultraviolet light, it is preferable in order to prevent the occurrence of side reactions that intense flash irridiation with only a few milliseconds lapse be employed when exposing the gas to the photochemical energy. At least 2400 joules of energy are required per flash at a partial pressure of about 200 mm. of mercury of $SO_2$ to complete the desired reaction effectively. While a greater amount of energy can be applied per flash, conversions are not proportionately increased with the application of additional photochemical energy. As a result, equipment which provides an energy output of 2400 to 3600 joules is suitable for this process when operating at a pressure of about 200 mm. of mercury. A discussion of the basic reaction mechanism is discussed in "The Photochemical Decomposition of Gaseous Sulphur Dioxide," by R. A. Hill, Trans. Faraday Soc., 1924.

It should be noted that the energy required is directly proportional to the partial pressure of the gas; thus if the partial pressure of the gas falls below 200 mm. of mercury of $SO_2$, then less energy is required. For example, when operating at a pressure of about 10 mm. of mercury pressure, only about 100 joules of energy are required; whereas if the operating pressure is about 1000 mm. of mercury, then about 50,000 joules of energy are required. As aforementioned, it is preferred that the gas be subjected to multiple flashes rather than a continuous irridiation with ultraviolet light. As such, the flash emitting the required amount of photochemical energy should last for a period of from 2 to 4 milliseconds.

Other features and embodiments of the instant invention, in addition to those heretofore recited, will become apparent from the accompanying drawings which diagrammatically show the essential novel elements of the invention.

Figure 1:
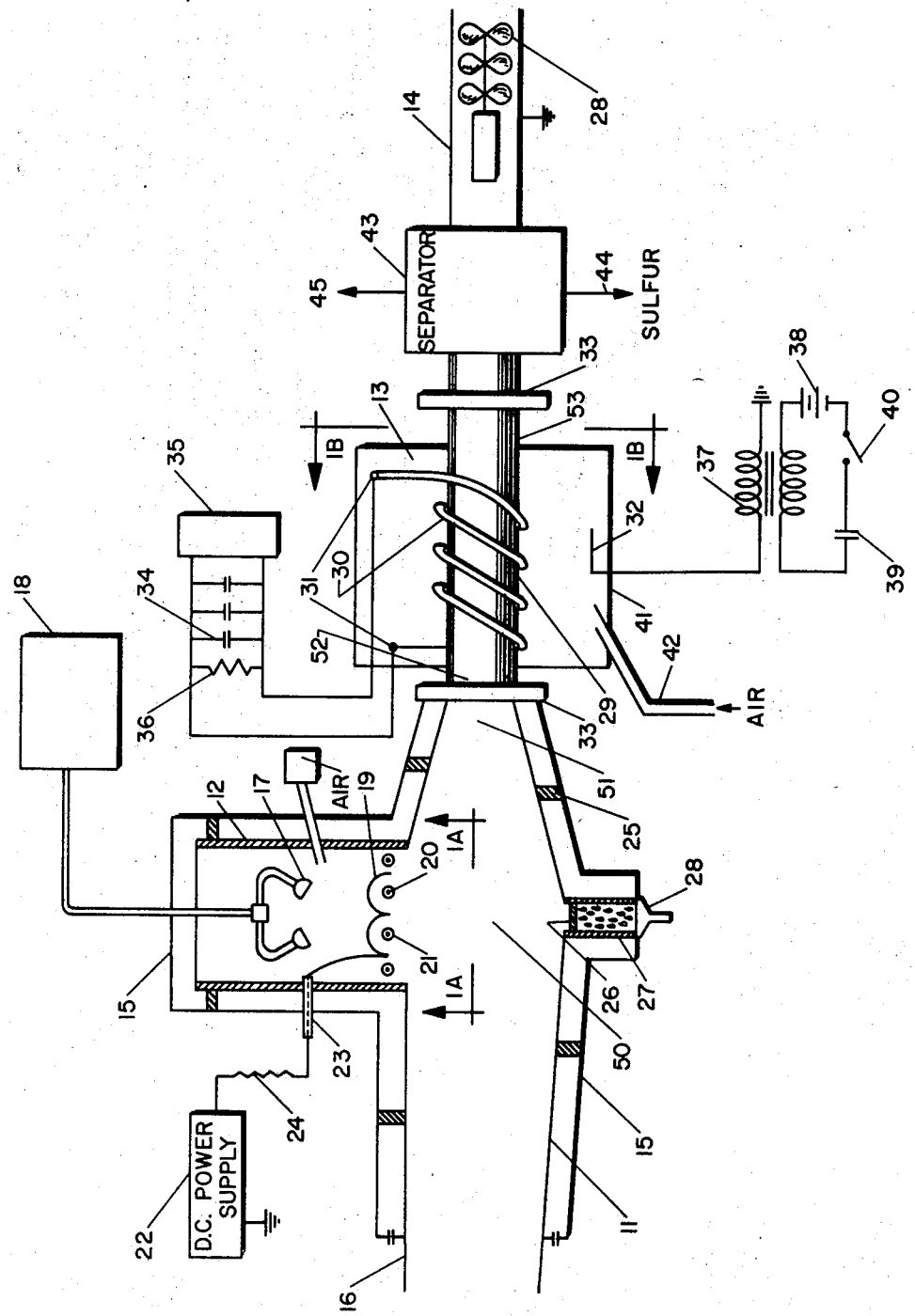
FIG. 1 is a view showing an illustrative embodiment of the invention with portions shown in diagrammatic and/or schematic form.
Figure 1A:
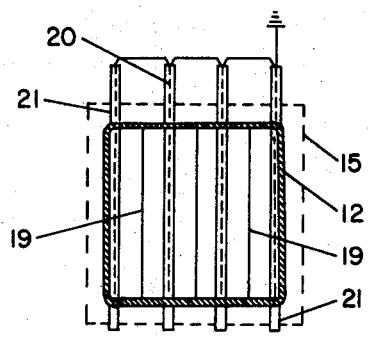
FIG. 1A is a view of a form of the invention shown in FIG. 1, taken in the direction of the arrows 1A—1A in FIG. 1.
Figure 1B:
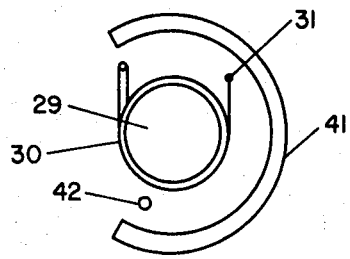
FIG. 1B is a view of a form of the invention shown in FIG. 1, taken in the direction of the arrows 1B—1B in FIG. 1.

Referring to FIG. 1, apparatus for removing sulfur dioxide from stack gas is shown as being composed of four sections generally designated as 11, 12, 13, and 14. Sections 11 and 12 are of an electrical insulating material such as phenolic, treated masonite, or any other similar insulating material and are surrounded by an electrically grounded metallic shield 15, which is spaced from said sections by electrical insulators 25. Section 14 is of metal and is electrically grounded.

The contaminated stack gas passes into section 11 via opening in inlet portion 16 which can be an integral part of the stack gas or a draw-off line. The gas may be forced through the sections by the gas pressure at the input opening 16 or drawn through by mechanical fans 29 located in section 4. The gas comes into intimate contact in the intermediate mixing zone 50 of section 11 with liquid spray emitted from spray heads 17 located in spray chamber section 12. Spray heads 17 are supplied spray liquid from an external source 18 at some pressure in the neighborhood of 30 to several hundred pounds per square inch depending on the type of spray heads used.

As the liquid spray passes through section 12, it encounters electrical charging means consisting of fine wires 19 spaced between metallic electrodes 20 which are provided with electrical insulation 21 to withstand a working voltage of 20,000 volts D.C. or more. The electrodes 20 are electrically connected together and grounded externally of the enclosure as indicated in sectional view 1A—1A. The insulating and grounding arrangement is provided in order to preclude electrical flashover between fine wires 19 and electrodes 20 when a high enough voltage is used to provide a strong electrostatic field between fine wires 19 and electrodes 20.

The fine wires 19 are given an electrical charge of approximately 10,000 to 20,000 volts D.C. above ground potential by power supply 22 which voltage is applied through insulator 23. Resistor 24 is provided to limit the current in case of a short circuit between wires 19 and electrodes 20. The insulating material 21 is also preferably treated with a silicone-type paint to prevent the collection of charged spray particles on the insulation. As aforementioned, when the charged spray comes in contact with the sulfur dioxide, it will absorb thereon. Any liquid spray which is condensed in section 11 is drained away through a drain pipe. The preferred arrangement which is shown is designed to prevent flashover to ground which would occur if the liquid were drained away in a continuous stream. The system is well known in the art and comprises a metal disc 26 provided with a number of holes to produce a dripping action in the chamber enclosed by insulating material 27. The liquid drips into the chamber and then out drain pipe 28.

The gas and the dissolved $SO_2$ then pass through the output portion 51 into the photochemical reaction zone generally designated as 13. Basically, the zone consists of an input portion generally designated as 52, a quartz tube reactor 29 surrounded by a xenon-filled helical photoflash lamp 30, and an outlet portion 53. The flash lamp has tungsten electrodes 31 and a trigger electrode 32. The quartz, is connected to sections 11 and 14 via fittings 33. Four condenser banks in parallel at 34 supply the discharge current. Each condenser bank contains four parallel-connected condensers of 25 microfarads each so that the total capacity is 400 microfarads. Generally, at least 300 microfarads are necessary and 300 to 500 microfarads is a suitable range. Power supply 35 supplies sufficient direct current voltage to obtain a maximum condenser voltage of 4000 volts and charges at rates up to 10 milliamperes. Shunt resistor 36 provides for bleeding off residual condenser charge after the lamp has been fired. The trigger circuit consists of the coil 37 capable of generating up to 10,000 volts in the secondary when the battery 38 is charged. Three-tenths microfarad condenser 39 is discharged through the switch 40 in the primary. The lamp is enclosed by an aluminum reflector 41 as indicated in sectional view 1B—1B, and dry air is blown through the space via line 42 between the reaction zone and the helix to keep the latter cool. In calibration, uranyl oxalate actinometry is used to measure the light output of each lamp flash, and flash duration is measured with an oscilloscope. It should be noted that the circuitry as aforedescribed is well known and standard in the art, and various modifications thereto which do not deter the activation of the UV lamps would be operable.

Following the photochemical reaction, the gas and sulfur particles pass into a separator. The separator can be any apparatus well known in the art for separating solid material from a gas. Examples of such apparatus are cyclone separators, filter screens, baffle plates, and the like. The gas is separated and leaves via line 45 while the sulfur and possibly any other particulate material present leave through line 44.

As a secondary embodiment of the instant invention, the helical source of ultraviolet light as depicted in FIG. 1 could be replaced by a lamp bank of high intensity mercury lamps. The bulbs would be connected in series in order to flash simultaneously. Also, a simple drain system could be employed in the mixing section rather than the flashover preventive type as aforedescribed.

As a further embodiment of the invention, particulate materials such as dust particles, fly ash, metal contaminants, etc., can be removed from the stack gas along with the sulfur dioxide by employing the methods as set forth in U.S. Pats. 2,357,355 and 3,331,192 which employ similar apparatus. As disclosed therein, the gas upon entrance into the mixing zone is subjected to an electric field which gives an electrostatic charge to the particulate material opposite to that of the water droplets. The charged droplets and the charged particulate material then are attracted to each other and are thereafter separated using baffle plates. In a like manner, a gas containing both particulate materials and sulfur dioxide can upon entrance into the mixing zone be subjected to an electric field. The electrostatically charged particulate material and the sulfur dioxide would then contact the charged water droplets as aforedescribed, and subsequently be removed from the gas by baffle plates and photochemical reaction, respectively. Preferably, the sulfur dioxide would be removed first so that a maximum amount of sulfur could be formed.

As will be well recognized by one skilled in the art, the embodiments of the invention as specifically described and illustrated herein are exemplary of the preferred modes of operation, and various modifications, such as vertical positioning of the apparatus, changing electrical connections, etc., can be made thereto without departing from the scope of the invention as defined in the claims.

I claim:
1. A process for removing sulfur dioxide from a gas, which comprises:
   (a) contacting a stream of sulfur dioxide-containing gas with electrostatically charged water droplets,
   (b) subjecting the droplet-containing gas to ultraviolet radiation, and thereafter
   (c) separating the sulfur particles formed during the photochemical reaction from the gas.
2. A process as described in claim 1 wherein the droplet-containing gas at a total partial pressure of from 10 mm. to 1000 mm. of mercury is subjected to multiple flashes of ultraviolet radiation sufficient to provide from 100 to 50,000 joules of energy.

References Cited
UNITED STATES PATENTS 3,389,971   6/1968   Alliger _____ 204—157.1

HOWARD S. WILLIAMS, Primary Examiner